United States Patent [19]

Leiber et al.

[11] 4,241,817
[45] Dec. 30, 1980

[54] DRIVE MECHANISM FOR MACHINES, HAVING IN PARTICULAR A GREAT MOMENT OF INERTIA

[75] Inventors: Wolfgang Leiber, Oberweikertshofen; Hans J. Ruesch, Munich, both of Fed. Rep. of Germany

[73] Assignee: Carl Hurth Maschinen-und Zahnradfabrik, Munich, Fed. Rep. of Germany

[21] Appl. No.: 921,087

[22] Filed: Jun. 30, 1978

[30] Foreign Application Priority Data

Jul. 2, 1977 [DE] Fed. Rep. of Germany ....... 2729935

[51] Int. Cl.³ .............................................. F16D 67/02
[52] U.S. Cl. ............................ 192/12 C; 192/12 D; 192/18 A
[58] Field of Search ................ 74/0.084, 0.096; 192/4, 192/7, 9, 12 D, 14, 12 C, 85 AA, 113 B, 18 A

[56] References Cited

U.S. PATENT DOCUMENTS

| | | | |
|---|---|---|---|
| 2,909,259 | 10/1959 | Diener, Jr. | 192/12 D X |
| 3,770,085 | 11/1973 | Cottingham | 192/18 A X |
| 3,834,502 | 9/1974 | Sommer | 192/12 C X |

Primary Examiner—Kenneth Downey
Attorney, Agent, or Firm—Blanchard, Flynn, Thiel, Boutell & Tanis

[57] ABSTRACT

An apparatus and a method for controlling the braking operation of a machine having a large moment of inertia. The machine is driven by a motor through a coupling device. The control circuitry initiates first an uncoupling of the coupling device followed by a braking of the input side of the coupling device. Thereafter, and after the input side of the coupling has come to a stop, the coupling device is reactivated to couple the output side to the input side. Since the input side is blocked, this will effectively bring the machine to a halt.

7 Claims, 4 Drawing Figures

DRIVE MECHANISM FOR MACHINES, HAVING IN PARTICULAR A GREAT MOMENT OF INERTIA

FIELD OF THE INVENTION

The invention relates to a drive mechanism and to a method for braking this driving engine.

BACKGROUND OF THE INVENTION

Brakable drive mechanisms for machines having a high inertia moment are known, which are stopped with the aid of an eddy-current brake. These units are expensive and the braking function requires a relatively long period of time.

The basis of the invention is a less expensive drive mechanism, which can be broken quicker.

Further advantages and characteristics of the invention can be taken from the following description.

BRIEF DESCRIPTION OF THE DRAWINGS

The invention is discussed in connection with exemplary embodiments, which are shown with FIGS. 1 to 4.

In the drawings.

DETAILED DESCRIPTION

Figure 1:
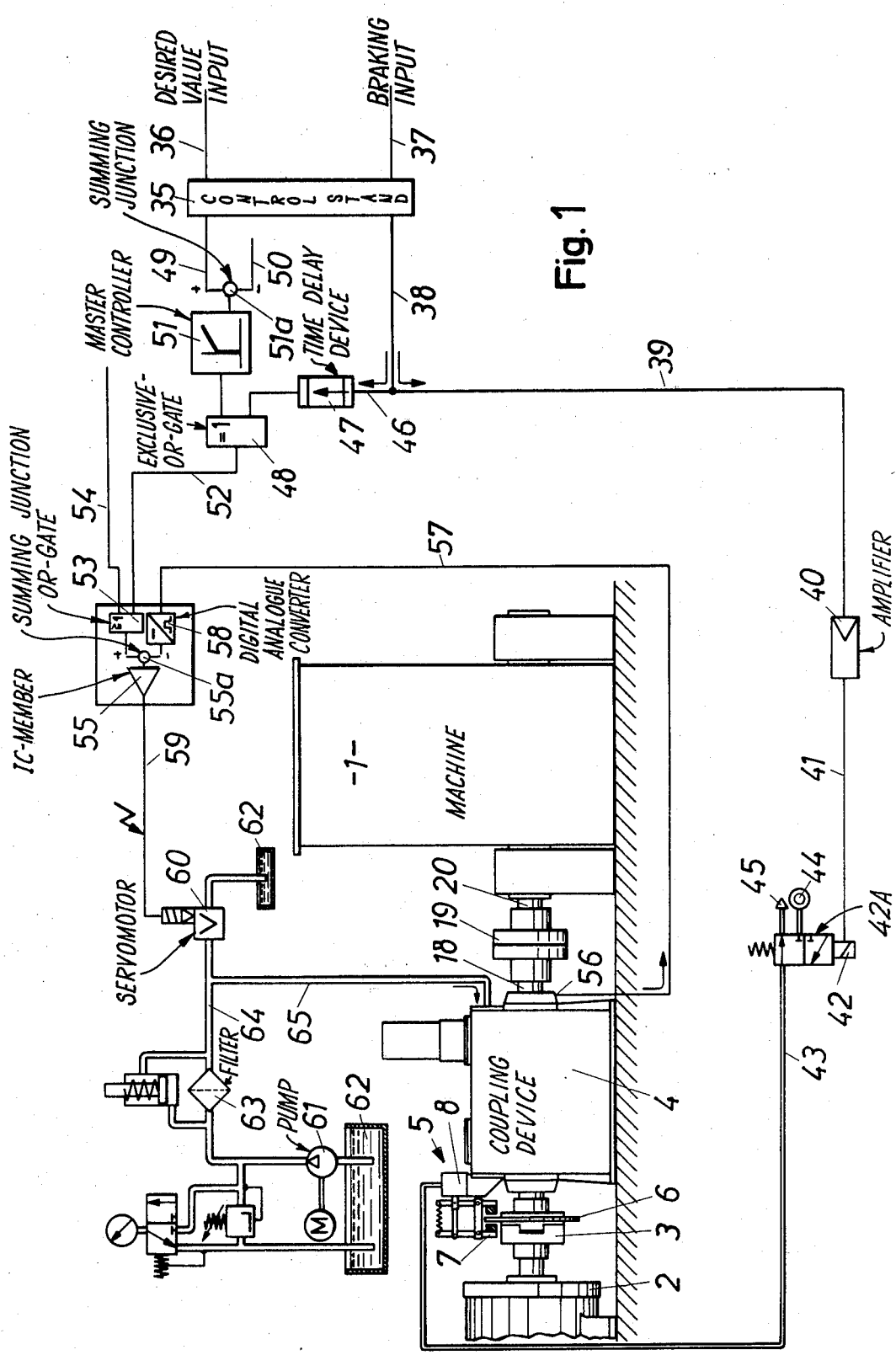
FIG. 1 illustrates the circuit diagram of a drive mechanism according to the invention.

FIG. 1 illustrates a circuit diagram for a drive mechanism for a machine 1, for example a hammer mill, having a great inertia moment. This drive mechanism is driven by an electric motor 2 through a jaw clutch 3 and a viscosity control coupling 4. The viscosity control coupling will be described hereinbelow with reference to FIGS. 3 and 4. A disk brake 5 has a pressure plate 6 and is located between the electric motor 2 or the jaw clutch 3 and the viscosity control coupling 4. The brake pressure plate 6 is engaged by brake shoes 7 driven by means of a pneumatically drivable brake piston guided in a brake cylinder 8.

Figure 3:
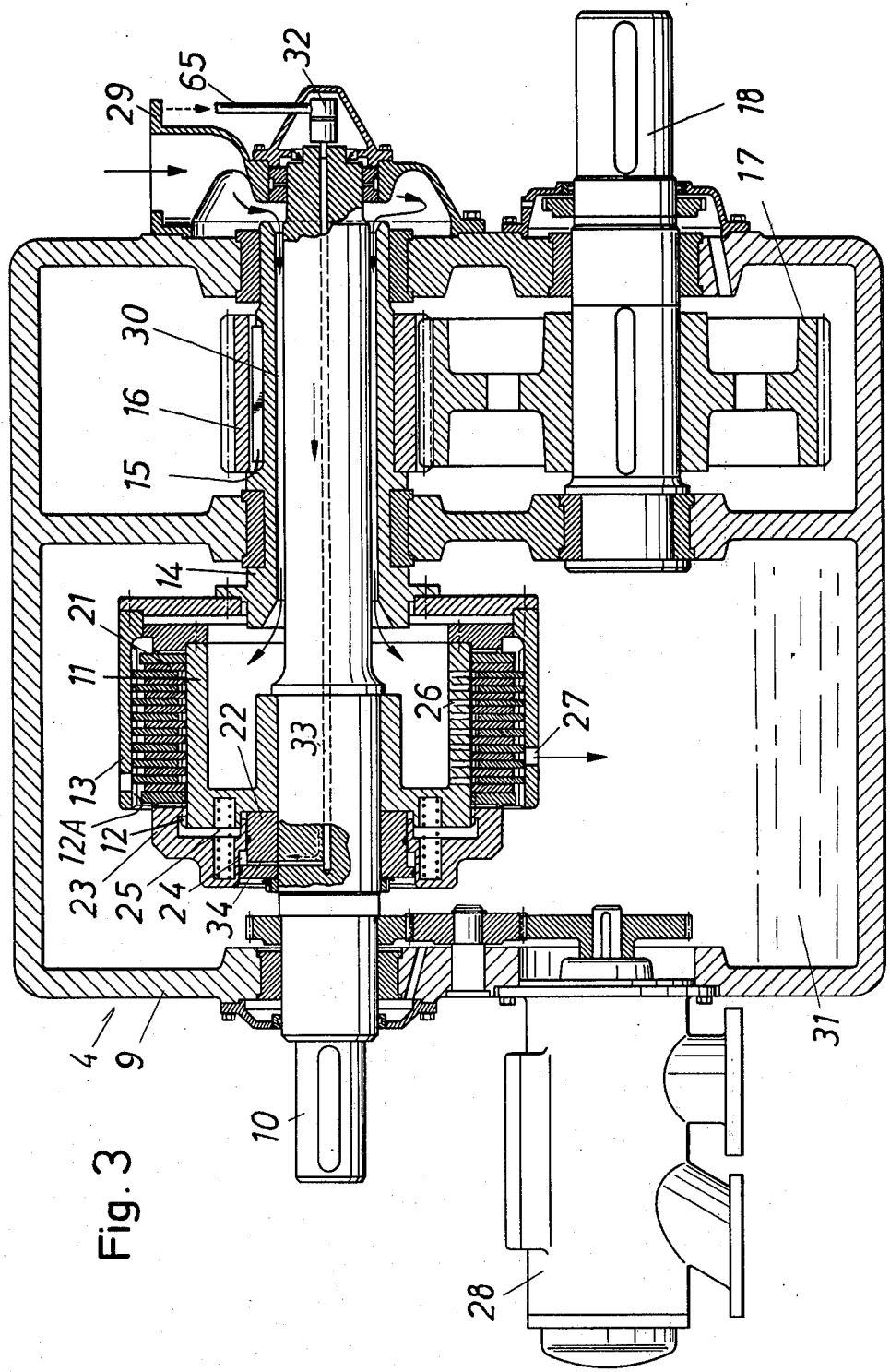
FIG. 3 illustrates an example for a viscosity control coupling for the invention namely in engaged condition.
Figure 4:
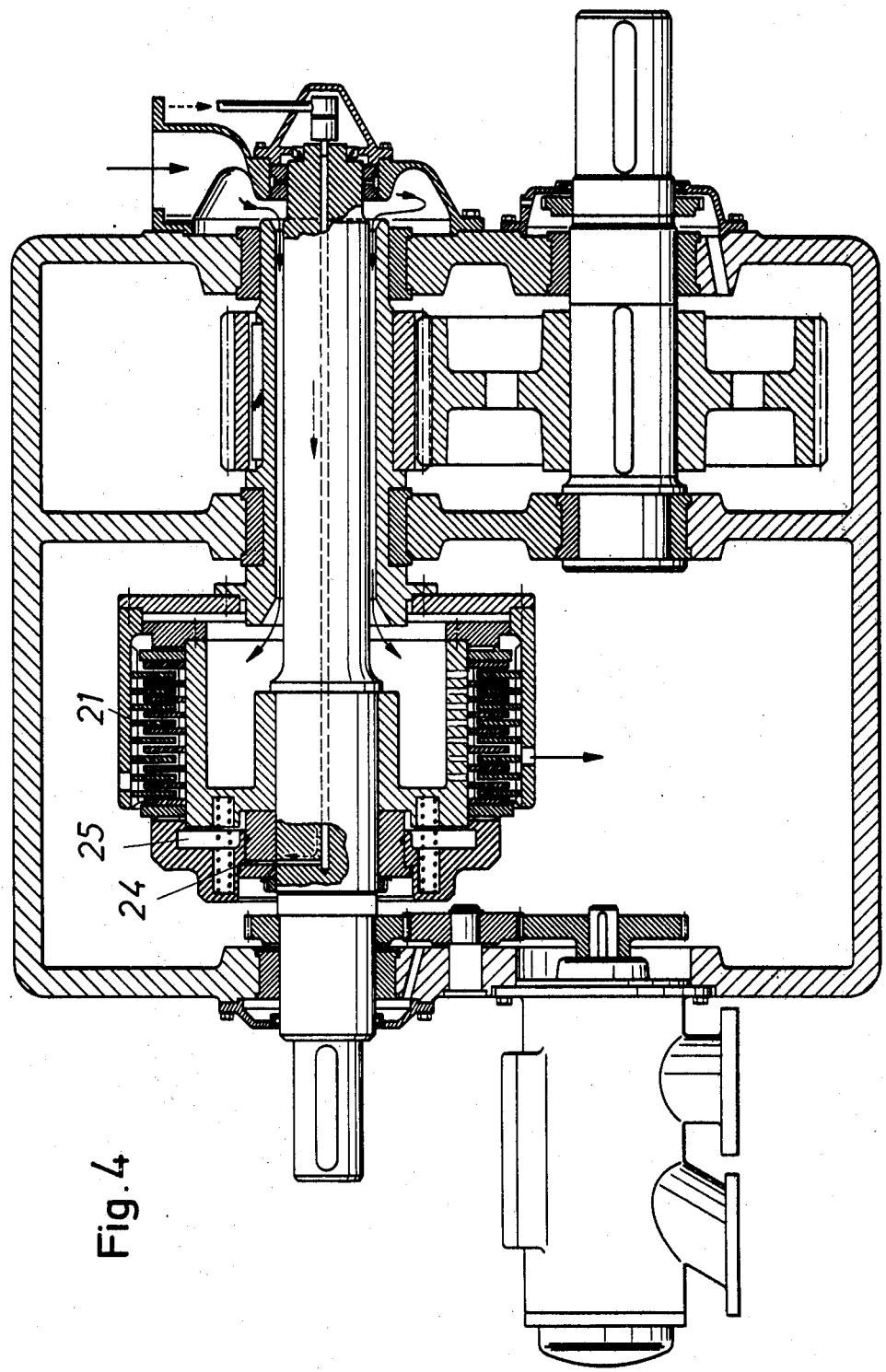
FIG. 4 illustrates the coupling according to FIG. 3 in disengaged condition.

FIG. 3 illustrates the viscosity control coupling 4. A drive shaft 10 is rotatably supported in a housing 9. An annular drive sleeve 11 is fixedly to the drive shaft 10 and is rotatable therewith. The annular drive sleeve 11 is encircled by a radially outwardly spaced driven sleeve 13 which is secured to a hollow shaft 14 encircling an end portion of the drive shaft 10. A spline 15 is fixedly disposed on the hollow shaft 14 and is meshed with a gear 16. The gear 16 is engaged with another gear 17 fixedly secured to and against a relative rotation with respect to a driven shaft 18. The driven shaft 18 is coupled by means of a disk coupling 19 (FIG. 1) with the mill drive shaft 20. Laminae 21 which are provided alternately with internal teeth and external teeth engage the external teeth 12 on the annular drive sleeve 11 and the internal teeth 12A of the annular driven sleeve 13. A pressure piston 22 is fixedly secured in peripheral and longitudinal direction to the drive shaft, on which pressure piston is nonrotatably supported, however, longitudinally movable, a pressure cylinder 23. A cylinder chamber 24 is provided between the pressure piston 22 and the pressure cylinder 23. If the cylinder chamber is filled with a pressure medium, for example oil, then the pressure cylinder engages the laminae to effect a coupling engagement therebetween. If the pressure medium is removed, then the springs 25 urge the pressure cylinder away from the laminae to effect an uncoupling. The character of the viscosity control coupling 4 is that various pressure medium circulations are provided for the pressure cylinder and for the gap between the laminae. The pressure acting onto the pressure cylinder can be controlled and thus the torque which is transmitted by the laminae can also be controlled. This controlled pressure medium is oil in the example, however, it may for example also be air. A cooling oil stream is provided for the gap between the laminae, which cooling oil stream is fed from the inside of the annular drive sleeve 11 through radially openings 26 to the gaps between the laminae and discharged through discharge openings 27 into a reservoir 31 in the housing 9. The speed of the driven side of the coupling thus depends mostly on the viscosity and the thickness of the layer of the cooling oil between the laminae. The cooling oil is drawn from a cooling oil pump 28 through a not shown pipeline out of the reservoir 31 and is fed through also not shown pipelines to the coupling, for which purpose a pipe connection 29 is provided on the outside of the housing 9. The cooling oil moves from the connection 29 through an annular gap 30 provided between the hollow shaft 14 and the drive shaft 10 to the inside of the annular drive sleeve 11.

The pressure medium, in the example oil, for controlling the viscosity control coupling 4, hereinafter referred to as control oil, enters the system through a supply sleeve 32 into a center opening 33 in the shaft 10 and is fed from there through a radially extending channel 34 to the cylinder chamber 24.

The following description relates to the circuit diagram of FIG. 1 having the control mechanism for the friction brake and the viscosity control coupling. An input for controlling the control coupling (desired value input 36) and an input for the brake (brake input 37) are provided at a control stand 35. From the brake input leads an electric brake line 38, 39 to an amplifier 40, which is connected to the coil of an electromagnet 42 through an amplifier line 41. The electromagnet controls a pneumatic valve 42A. A pneumatic brake line 43 which extends to the brake cylinder 8 can be selectively connected to the valve 42A and to a pneumatic supply mechanism 44 (compressor etc.) or to an exhaust outlet 45. The circuit diagram schematically illustrates side-by-side the two positions of the valve 42A. A branch line 46 is connected to and extends from the electric brake line 38, 39 to a time-delay member 47, for example a time relay, the output of which is connected to an input of an exclusive-OR-gate 48. (The output of an exclusive-OR-gate assumes only the value 1, when exclusively only one of the two inputs has the value 1 applied thereto.) The desired value input 36 produces a process reference input 49 and a process normal size 50 (actual value) which are supplied to a first summing junction 51a, the sum produced being acted upon in a master controller 51 through a desired value—actual value—comparison. The process reference input 49 depends from the respective process result, thus in the exemplary embodiment for example from the amount of steam of the boiler, which is heated by the coal dust which is produced in the hammer mill. The output of the exclusive-OR-gate is connected by means of the connection 52 to one input of an OR-gate 53, to the other input of which is connected a line 54 for effecting a manual operation. The output of the OR-gate 53 is connected to the input of a second summing junction 55a, the output of which is connected to the input of an IC-member (operational amplifier) 55.

An actual value indicator 56 for indicating the actual driven speed of the driven shaft 18 is arranged on the driven shaft 18 of the viscosity control coupling 4, which indicator is actually known. The signal value from the actual value indicator is fed through an actual value line 57 to the input of a digital-analogue converter 58, the output of which is connected to the other input of the second summing junction 55a. The OR-gate 53, the IC-member 55, the digital-analogue converter 58 and the summing junction 55a represent the important elements of a controller, which can be a proportional controller or a proportional integral controller or a proportional integral differential controller or the like, depending on the requirements. The output of the IC-member 55 is connected through an amplifier line 59 to a servovalve 60, which belongs to the hydraulic circulation system for the control oil, and which controls the pressure acting onto the laminae 21.

In the hydraulic circulation system, a pump 61 draws oil from a reservoir 62 and conveys it through a filter 63 and pressure lines 64, 65, the supply sleeve 32, the center opening 33, the channel 34 and thence to the cylinder chamber 24. The servovalve 60 is connected in circuit with the pressure line 64, 65, to regulate the pressure of the control oil depending on the value of the output signal from the IC-member 55. The hydraulic system is also equipped with common elements, for example, pressure indication, pressure relief valve, contamination indication for the filter and more, which do not need to be described more in detail.

If a signal is not applied to the desired value input 36, the servovalve 60 opens up totally, the pressure in the cylinder chamber 24 drops, the laminae 21 ventilate (see FIG. 4) and the torque transmission onto the mill 1 is interrupted. The braking operation is initiated by applying a signal to the brake input 37. As a result, first the disk brake 5 is put into operation by the circuit components 38, 39, 40, 41, 42, 43. After a period of time which is set on the timing circuit 47 and which assures that the drive shaft 10 has stopped, a signal is applied on the exclusive-OR-gate 48 and the viscosity control coupling 4 receives from the OR-gate 53 with the aid of the digital-analogue converter 58 and IC-member 55 and servomotor 60 an impulse for effecting a coupling operation, which causes the machine to be connected through the viscosity control coupling 4 to the stopped disk brake so that the braking work is controlled by the coupling 4 or the cooling oil between the laminae therein.

Figure 2:
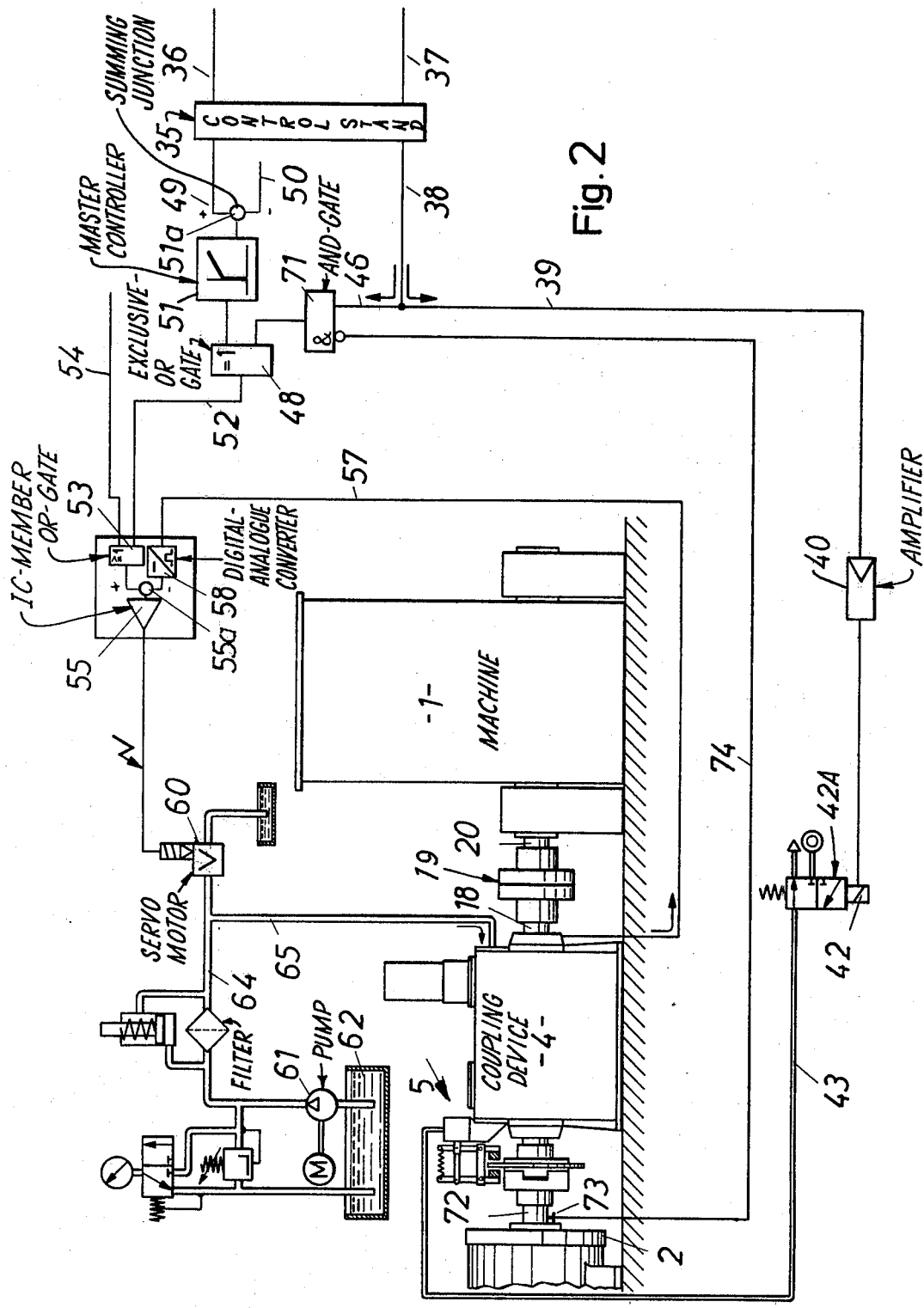
FIG. 2 illustrates the circuit diagram of a different embodiment of the invention.

FIG. 2 illustrates a very advantageous embodiment of the invention, in which the timing circuit is replaced by an AND-gate 71 with an inverted input. The branch line 46 which is connected to the electric brake line 38, 39 or the brake input is connected to one input (noninverted) of the said AND-gate 71.

An actual value speed indicator 73 is connected to the driven shaft 72 of the electric motor 2, namely, between the motor and the viscosity control coupling 4, which indicator 73 transmits its output signal through a second actual value line 74 to the inverted input terminal of the AND-gate 71. The output of the AND-gate is connected, like in the aforedescribed circuit diagram, to an input of the exclusive-OR-gate 48. The further control circuit operates as was described in connection with FIG. 1.

The braking operation is similar to that which was described earlier, however, the exclusive-OR-gate does not receive from the braking side a signal after a set time following the initiation of the braking operation, but from the actual value speed indicator 73 through the second actual value line and the inverted input of the AND-gate 71, namely when the actual value speed indicator announces the speed "0". This embodiment can have considerable advantages compared with the use of a timing element, due to the automatic dependency from the standstill of the driven shaft 72 or the drive shaft 10, because of the greater degree of switching safety.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A drive mechanism for a machine having an input shaft, said machine having in particular a great moment of inertia, comprising:
   a drive motor having an output shaft;
   coupling means having an input shaft and an output shaft, said output shaft of said coupling means being connected to said input shaft of said machine;
   brake means connected between said output shaft of said motor and said input shaft of said coupling means and means for activating same;
   said coupling means including a friction clutch having a controllable transmittable torque characteristic connected to and between said input shaft and said output shaft therefor;
   reciprocal piston means in said coupling means operatively related to said friction clutch for establishing a desired transmittable torque characteristic;
   control means for controlling said transmittable torque characteristic of said friction clutch, said control means including:
     an actual value indicator producing a first signal for indicating the driven speed of said output shaft of said coupling means;
     a master controller producing a second signal for indicating the desired speed of said output shaft of said coupling means; and
     a controller responsive to said actual value indicator and said reference element for controlling the force and direction of said force on said reciprocal piston to thereby control the speed of said output shaft of said coupling means.

2. The drive mechanism according to claim 1, wherein said friction clutch is a multiple disk friction clutch, the pressure between the disks of which can be controlled by said controller.

3. The drive mechanism according to claim 2, wherein two supply mechanisms are provided for said friction clutch, wherein the one serves to control the pressure of said reciprocal piston on the disks and the other one serves to control the amount of pressure medium between the disks, which amount is sufficient for effecting a transmitting of torque.

4. The drive mechanism according to claim 3, wherein said coupling means includes a pump driven by means connected to said input shaft to said coupling means, said pump supplying said pressure medium between said disks in a sufficient amount for effecting a transmitting of torque.

5. The drive mechanism according to claim 1, wherein said controller has two input terminals, wherein said means for activating said brake includes a brake input terminal, said brake input terminal being connected to said brake and through a time-delay member by means of an OR-gate to said master controller, wherein the output of said OR-gate representing said desired value is connected to one of said input terminals to said controller, and wherein the output of said actual value indicator is connected to the other of said input terminals to said controller.

6. The drive mechanism according to claim 1, wherein said controller has two input terminals, wherein said means for activating said brake includes a brake input terminal; wherein a second actual value indicator is provided for producing a second signal indicative of the driven speed of said drive motor; wherein said brake input terminal is connected to said brake and to said second actual value indicator by means of an AND-gate; wherein the output of said AND-gate is connected to said master controller by means of an OR-gate; wherein the output of said OR-gate is connected to one of said input terminals on said controller and wherein the first mentioned actual value indicator is connected to the other of said input terminals.

7. A method for braking a machine, having in particular a great moment of inertia, comprising the following method steps:
(a) uncoupling the output shaft of a motor from said machine;
(b) braking said output shaft of said uncoupled motor; and thereafter
(c) coupling the coasting machine to the now braked output shaft with an increasing coupling power to bring said coasting machine to a stop.

* * * * *